A. R. HURST.

Manure Excavator.

No. 939.

Reissued April 3, 1860.

N. PETERS, Photo-Lithographer, Washington, D. C.

UNITED STATES PATENT OFFICE.

ABRAHAM R. HURST, OF CHAMBERSBURG, PENNSYLVANIA.

IMPROVEMENT IN MANURE-EXCAVATORS.

Specification forming part of Letters Patent No. 11,610, dated August 29, 1854; Reissue No. 939, dated April 3, 1860.

*To all whom it may concern:*

Be it known that I, ABRAHAM R. HURST, of Chambersburg, in the county of Franklin and State of Pennsylvania, have invented a new and useful Improvement in Machines for Excavating or Removing Manure, &c., from one place to another; and I do hereby declare that the following is a full, clear, and exact description of the same, reference being had to the accompanying drawings, forming a part of this specification, in which—

Figure 1:
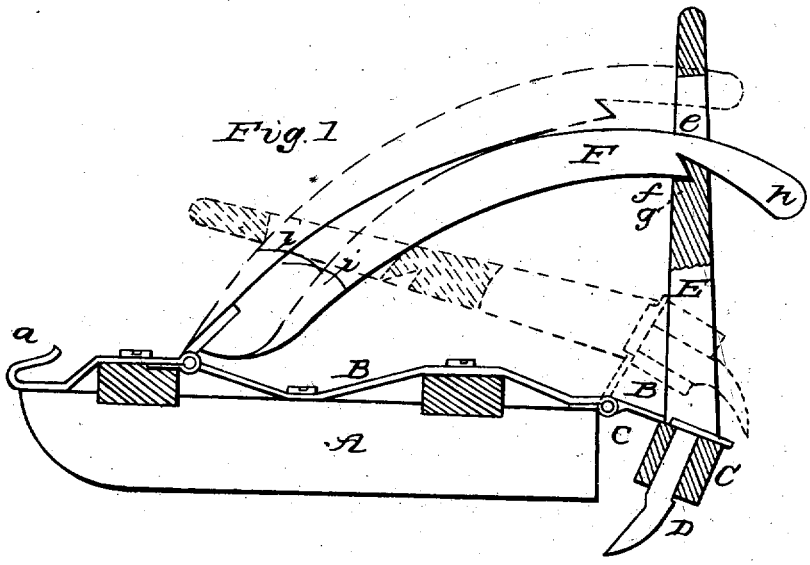
Figure 2:
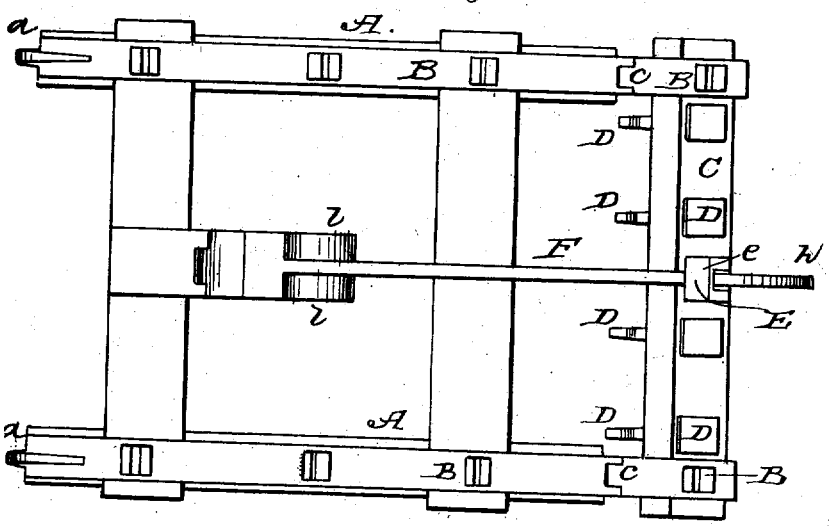

Figure 1 is a side elevation of my invention. Fig. 2 is a top view of the same.

Similar letters of reference in each of the several figures indicate corresponding parts.

The nature of my invention consists, first, in the employment of the hinged pitchfork or rake having an oblong slot and a stop-notch in its handle, in combination with the curved hinged locking-bar and a draft-bar, substantially as hereinafter described.

It consists, second, in the combination of the devices mentioned above with a sled or carriage, substantially as hereinafter described.

By the first feature of my invention the pitchfork can be set to a proper position for taking a load, and kept in this position until the load has been moved to the proper place of deposit, and then can be set free and allowed to deliver itself ready for another operation. By the second feature of my invention conveniences for moving or dragging the implement from place are afforded.

To enable others skilled in the art to make and use my invention, I will proceed to describe its construction and operation.

A in the accompanying drawings represents a sled, strongly braced by the draft-iron straps B B, each of which terminates at its front end in a hook, *a*, to which the power is attached; or both may meet at the center of the implement, and thus have but one hook.

C is the swinging pitchfork or rake. The head of the fork or rake is hinged to the sled by joints *c c*, so as to be capable of swinging on said joints when necessary.

The teeth D may be placed at any suitable distance apart, and may extend from one side of the sled to the other, as shown in Fig. 2.

E is an upright lever for throwing the teeth in operative position. It is attached to the swinging cross-head, as shown in Fig. 1. *e* is a slot cut through said lever.

F is a curved swinging stop-bar for keeping the lever E in place while the excavating operation is being carried on. The bar F moves in the slot *e* of the lever E, and holds the said lever in the position shown in black in Fig. 1 by means of the stop *f*, which fits in the recess *g* in the lever, as shown clearly in the drawings, Fig. 1. By means of this lever it will be seen that when the resistance is greatest on the teeth the operation of the bar as a stop is the most effective.

The lever E can be depressed and the teeth thrown out of operation by moving the end *h* of the bar F to the position shown in red in Fig. 1, this operation drawing the stop *f* out of the recess *g*. The position of the teeth when elevated or out of operation will be seen in red in Fig. 1, and their position when in operation in black lines in the same figure. The lever E rests on the shoulders *i i* of the bar F when the teeth are not in operation. The teeth of the implement are forced into the manure and the sled or draft-bar B is moved in the proper direction by hand or horse, and the pitchfork caused to take a firm hold upon a large portion of the manure or other substance and carry it to the desired place of deposit.

It must be evident that a large quantity of manure can be speedily removed from one place to another with a slight expenditure of labor with this implement.

What I claim as my invention, and desire to secure by a reissue of these Letters Patent, is—

1. The employment of the hinged pitchfork or rake having an oblong slot, *e*, and a stop-notch, *g*, in its handle E, in combination with the curved hinged locking-bar F and a draft-bar, B *a*, substantially as and for the purposes set forth.

2. The combination of the devices mentioned above with a sled or carriage, A, substantially as and for the purposes set forth.

ABRAHAM R. HURST.

Witnesses:
D. A. WERTZ,
P. HAMMAN.